US008838806B2

(12) United States Patent
Lu et al.

(10) Patent No.: US 8,838,806 B2
(45) Date of Patent: Sep. 16, 2014

(54) CONNECTION MANAGEMENT FOR M2M DEVICE IN A MOBILE COMMUNICATION NETWORK

(75) Inventors: Yang Lu, Düsseldorf (DE); Peter Wild, Krefeld (DE); Alexej Kulakov, Düsseldorf (DE)

(73) Assignee: Vodafone Holding GmbH, Dusseldorf (DE)

( * ) Notice: Subject to any disclaimer, the term of this patent is extended or adjusted under 35 U.S.C. 154(b) by 253 days.

(21) Appl. No.: 13/070,652

(22) Filed: Mar. 24, 2011

(65) Prior Publication Data
US 2011/0238844 A1  Sep. 29, 2011

(30) Foreign Application Priority Data
Mar. 29, 2010  (EP) .................................. 10158171

(51) Int. Cl.
| | | |
|---|---|---|
| H04L 29/08 | (2006.01) | |
| H04W 76/02 | (2009.01) | |
| H04W 80/04 | (2009.01) | |
| H04W 48/00 | (2009.01) | |

(52) U.S. Cl.
CPC ............ *H04W 76/021* (2013.01); *H04L 67/12* (2013.01); *H04W 80/04* (2013.01); *H04L 67/1002* (2013.01); *H04L 67/14* (2013.01); *H04W 48/17* (2013.01)
USPC ........................................................ 709/227

(58) Field of Classification Search
None
See application file for complete search history.

(56) References Cited

U.S. PATENT DOCUMENTS

| | | | | |
|---|---|---|---|---|
| 6,078,826 | A * | 6/2000 | Croft et al. ..................... | 455/574 |
| 6,275,695 | B1 * | 8/2001 | Obhan ........................... | 455/423 |
| 6,393,285 | B1 * | 5/2002 | Stephens ..................... | 455/435.1 |
| 6,584,331 | B2 * | 6/2003 | Ranta ............................ | 455/574 |
| 7,212,818 | B2 * | 5/2007 | Haumont ................... | 455/435.1 |
| 7,343,167 | B2 * | 3/2008 | Kang et al. ..................... | 455/458 |
| 8,103,287 | B2 * | 1/2012 | Mueck et al. .............. | 455/456.1 |
| 8,180,402 | B2 * | 5/2012 | Dewey et al. ................. | 455/558 |
| 8,224,322 | B2 * | 7/2012 | Pan ........................... | 455/435.1 |
| 8,238,901 | B2 * | 8/2012 | Pudney et al. .............. | 455/426.1 |
| 8,265,022 | B2 * | 9/2012 | Hans ............................ | 370/329 |
| 8,310,990 | B2 * | 11/2012 | Pan ............................. | 370/328 |
| 8,326,286 | B2 * | 12/2012 | Pan ........................... | 455/432.1 |

(Continued)

FOREIGN PATENT DOCUMENTS

EP        2375849 A1   10/2011

OTHER PUBLICATIONS

EPO Application and ISR (10158171,8-2413)—EP: 2375849A1.*

(Continued)

*Primary Examiner* — Hassan Phillips
*Assistant Examiner* — Omeed D Rahgozar
(74) *Attorney, Agent, or Firm* — International IP Law Group, PLLC (57) ABSTRACT

There is provided a method that relates to the setting up and/or maintaining of a connection between a machine-to-machine (M2M) device and a mobile communication network. In order to be able to adapt the connection management to the requirements of the M2M device, the M2M device may transmit an indication that it is an M2M device to the mobile communication network. At least one network node of the mobile communication network controls the setting up and/or the maintaining of the connection based on the indication. The network node may route a request for setting up the connection to a further network node based on the indication.

12 Claims, 3 Drawing Sheets

(56) References Cited

U.S. PATENT DOCUMENTS

| | | | | |
|---|---|---|---|---|
| 8,340,667 | B2* | 12/2012 | Pan | 455/433 |
| 2004/0030601 | A1* | 2/2004 | Pond et al. | 705/16 |
| 2005/0119008 | A1* | 6/2005 | Haumont | 455/456.1 |
| 2010/0057485 | A1* | 3/2010 | Luft | 705/1 |
| 2011/0213871 | A1* | 9/2011 | DiGirolamo et al. | 709/223 |

OTHER PUBLICATIONS

LG Electronics, A Control Plane Architecture for machine-type communication, 3GPP Draft; S2-096571_MTC, 20091116 3rd Generation Partnership Project (3GPP), Mobile Competence Centre; 650, route des Lucioles; F-06921 Sophia-Antipolis Cedex; France, Publication XP050397514, Nr: Cabo; 20091116, pp. 1-9, English.

Author Unknown, 3rd Generation Partnership Project; Technical Specification Group Services and System Aspects; Service Requirements for machine-type communication; Stage 1 (Release 10), 3GPP Draft; 22368-122 cl, 20100302 3rd Generation Partnership Project (3GPP), Mobile Competence Centre; 650, route des Lucioles; F-06921 Sophia-Antipolis Cedex; France, Publication XP050416724, Vol: TSG GERAN, Nr:Berlin; 20100301, pp. 1-23, English.

European Search Report, EP Publication No. 2375849A1, Application No. EP10158171, Date of Completion of Search Oct. 14, 2010.

* cited by examiner

CONNECTION MANAGEMENT FOR M2M DEVICE IN A MOBILE COMMUNICATION NETWORK

CROSS REFERENCE TO RELATED APPLICATION

This application claims priority to European (EP) Patent Application No. 10 158 171.8-2413, filed on Mar. 29, 2010, the contents of which are incorporated by reference as if set forth in their entirety herein.

BACKGROUND

Is to be understood that the term "connection", as used herein with reference to a connection between a mobile communication device, specifically a machine-to-machine (M2M) device, and a mobile communication network refers to a state in which a mobile communication device, particularly an M2M device, is attached to and/or registered in the mobile communication network. In this state, there is not necessarily a data connection for exchanging user data established between the mobile communication device and the mobile communication network. Thus, when a mobile communication device is in a so called idle mode, there is also a connection between the mobile communication device and the mobile communication network. Where it is specifically referred to a data connection between a mobile communication device and the network, this is identified herein.

The term machine-to-machine (M2M) stands for the automatic exchange of data between technical devices and a device which takes part in such data exchange is referred to as M2M device. There exists a multitude of applications for M2M communications particularly in the field of remote maintenance and teleservices. M2M devices may be used for transmitting measured data to remote locations or for receiving and executing control commands received from remote locations. For this purposes, the M2M devices may be equipped with or coupled to sensors for measuring data and/or actors for controlling or moving certain appliances.

M2M communications may particularly be performed wirelessly in order to connect M2M devices to systems at remote locations. One possibility for performing a wireless communication is a data transmission via a mobile communication network using a messaging service or a data service provided by such network.

An M2M device which is operated in a mobile communication network usually has a different behavior and different requirements than a mobile communication device of a human user. For instance, an M2M device might generate very small quantities of traffic and might transmit and/or receive data only in greater intervals. However, a multitude of M2M devices might transmit and/or receive data essentially at the same time. For example, this may be the case when a multitude of M2M device is programmed to transmit data at certain hour of the day. Furthermore, unlike mobile communication devices of human users, some M2M device may be operated essentially stationary and thus have no or low mobility.

In order to meet the different requirements of mobile communication devices of human users and M2M device, it may be desirable to manage the connections of M2M devices to a mobile communication network in another way than the connections of mobile communication devices of human users. In particular, it may be desirable to already control the set up of a connection between an M2M device and a mobile communication network differently than the set up of a connection of another mobile communication device. Furthermore, it may be desirable to control the maintaining of the connection between an M2M device and a mobile communication network differently than other connections.

SUMMARY

Exemplary embodiments of the subject innovation may allow for better adaption of a management of a connection of an M2M device to a mobile communication network to the requirements of the M2M device.

According to the subject innovation, a method for setting up and/or maintaining a connection between an M2M device and a mobile communication network is suggested. In the method, a network node of the mobile communication network receives an indication specifying that the device is an M2M device and being sent by the M2M device, and the network node controls a setting up and/or a maintaining of the connection based on the indication.

An M2M device for performing a method according to the subject innovation is suggested. The M2M device may be programmed to transmit an indication that it is an M2M device to a mobile communication network, when it logs on to the mobile communication network.

A network node of a mobile communication network for controlling a setting up and/or a maintaining of a connection between the mobile communication network and an M2M device according to the subject innovation is provided. The network node is adapted to receive an indication specifying that the device is an M2M device and being sent by the M2M device and to control the setting up and/or the maintaining of the connection based on the indication.

The subject innovation relates to the management of a connection of an M2M device to a mobile communication network. In particular, the subject innovation is related to a method and to a network node of a mobile communication network for setting up and/or maintaining a connection between an M2M device and a mobile communication network. Moreover, the subject innovation relates to an M2M device for performing the method.

According to the subject innovation, an M2M device identifies itself towards a mobile communication network as an M2M device, when it logs on to the network. This allows the mobile network to adapt the handling of the connection to the M2M device according to the fact that the device is an M2M device. In particular, the mobile communication network may handle the connection in a different way than connections to other mobile communication devices, particularly mobile communication devices of human users. Thereby, the handling of the connection can particularly be adapted to the special requirements that exist in connection with M2M devices.

Advantageously, the handling of the connections that is done based on the indication includes the setting up and/or the maintaining of the connection. The setting up of a connection particularly includes procedures which are executed in connection with attaching a mobile communication device, particularly an M2M device to the mobile communication network. Maintaining a connection particularly includes procedures which are executed when a mobile communication device, particularly an M2M device, is connected to the mobile communication network.

In one exemplary embodiment, a first network node of the mobile communication network routes a request for setting up the connection to a second network node of the mobile communication network based on the indication. For this purpose, the network node according to the subject innovation may particularly be adapted to route a request for setting up the connection to a second network node of the mobile communication network based on the indication.

It is an advantage of these exemplary embodiments that connections to M2M devices can be handled by a predetermined network node of the mobile communication network. The network node may be used essentially only for controlling the setting up and/or the maintaining of connections to M2M devices and/or essentially all the setting-up and/or maintaining of connections to M2M devices may be controlled essentially only by the network node. Here, the term "essentially only" particularly means that the handling is done in such way by default, while there may be special circumstances which lead to another handling.

By providing a predetermined network node for handling connections to M2M devices, high traffic, which might occur for M2M devices at certain points in time, does not affect the connections of other mobile communication devices. For instance, such high traffic may be due to a possible programming of a multitude of M2M devices to connect to remote locations at certain point in time. Furthermore, special routines for controlling the setting up and/or the maintaining of connections of M2M devices may be implemented exclusively in the network node allocated to M2M devices. Thus, connections of M2M devices can be controlled in a special way without having to implement such routines in each network node.

In an exemplary embodiment, the first network node is connected to a plurality of networks nodes of one type, the first network node selecting the second network node to which the request is routed from the plurality of network nodes based on the indication. Moreover, the network node according to the subject innovation may be connected to a plurality of further networks nodes of one type and may be adapted to select the second network node to which the request is routed from the plurality of further network nodes based on the indication.

In an exemplary embodiment, the second network node transmits to the first network node an information that the second network node is responsible for M2M devices, when connecting the first and the second network node, and the first network node routing the request for setting up the connection to the second network node based on the information received from the second network node. Moreover, the network node according to the subject innovation may particularly be adapted to receive from a second network node information that the second network node is responsible for M2M devices, and to route the request for setting up the connection to the second network node based on the information received from the second network node.

Advantageously, these exemplary embodiments include an automatic self-configuration of a connection between the network nodes. Thus, it is not required to manually store in the (first) network node the allocation of the second network node to M2M devices. This simplifies the configuration of the mobile communication network.

In further exemplary embodiments, the indication sent by the M2M device includes a specification of the type of the M2M device. Particularly, the type of the M2M device is selected from a set of predetermined types. Examples of such types are M2M devices that are essentially stationary or fast moving or M2M devices that sent and/or receive a high or low amount of data. The setting up and/or the maintaining of the connection of an M2M device may be controlled based on the type of the M2M device. For instance, a network node may instruct a stationary M2M device to inform the network about its location in predetermined time intervals, which may be greater than those in which other mobile communication devices inform the network about their location. Hereby, network traffic can be reduced, and unnecessary traffic can be avoided. It may also be provided that further or all M2M devices are so instructed, particularly, if the indication does not include an information about the type of the M2M device.

Furthermore, in exemplary embodiments of the subject innovation, the first network node is a network node of a radio access network of the mobile communication network, particularly a base station system of the mobile communication network. The second network node may be network node of a core network of the mobile communication network in one specific implementation, particularly a Mobility Management Entity (MME) or a Serving GPRS Support Node (SGSN).

BRIEF DESCRIPTION OF THE DRAWINGS

The aforementioned and other aspects of the invention will be apparent from and elucidated with reference to the exemplary embodiments described hereinafter making reference to the accompanying drawings, in which.

DETAILED DESCRIPTION OF SPECIFIC EMBODIMENTS

Figure 1:
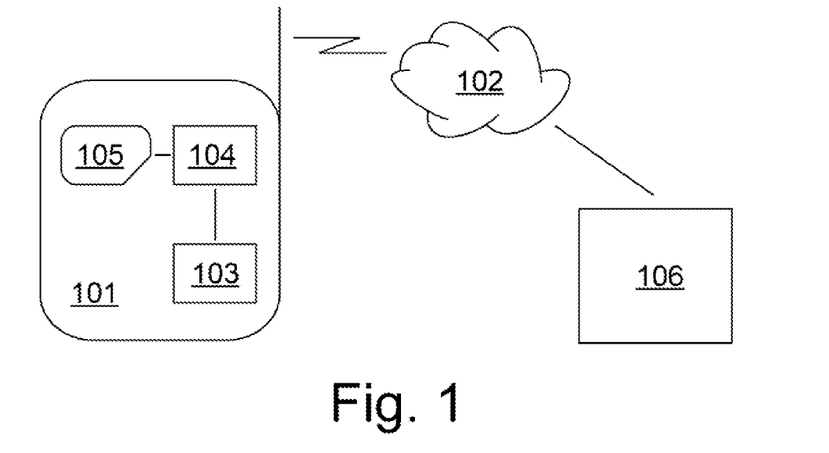
FIG. 1 is a block diagram of an M2M device for connecting to a remote location via a mobile communication network.

FIG. 1 schematically shows an M2M device 101, which is one mobile communication device that can be connected to a mobile communication network 102. Through the mobile communication network 102, the M2M device may be connected to a remote location 106.

In the exemplary embodiment, which is depicted in FIG. 1 by way of example, the M2M device includes a unit 103, which may include at least one sensor for measuring a quantity and/or at least one actor for moving or controlling an appliance. In addition or as an alternative to the unit 103, the M2M device 101 may comprise an interface for coupling the M2M device 101 to an external sensor and/or actor at the location of operation of the M2M device 101. Furthermore, a modem 104 is included in the M2M device 101 for connecting to the mobile communication network 102. Using the modem 104 the M2M device is capable of transmitting data measured with the sensor(s) in the unit 103 to the remote location 106 or receiving data from the remote location 106 through one or more communication service(s) provided by the mobile communication network 102. The received data may be commands for controlling the actor(s) or further commands, e.g. for configuring the sensor(s) and/or actor(s) of for similar purposes.

The modem 104 may be coupled to a subscriber identification module (SIM) 105, which is associated to a subscription with the mobile communication network 102 and which is generally used for identifying and/or authenticating the M2M device 101 in the mobile communication network 102.

The SIM may be included in a smartcard that may be inserted into the M2M device 101. It is to be understood that the terms subscriber identification module and SIM as used herein are not limited to a specific embodiment of the SIM or to a specific mobile communication standard. Rather, the terms generically refer to a module which includes data and/or functions for identifying and/or authenticating a device or a subscription in the mobile communication network 102.

The SIM 105 may be configured according to the mobile communication network 102 in which the M2M device 101 is operated. In specific embodiments, the SIM 105 may be configured as a SIM according to one standard version of the 3rd Generation Partnership Project (3GPP), particularly as a SIM of a Global System for Mobile Communications (GSM) or as a Universal Subscriber Identification Module (USIM) of a 3rd (3G) or 4th (4G) generation mobile communication system, specifically a Universal Mobile Telecommunications System (UMTS) or an Long-Term Evolution (LTE) system.

Figure 2:
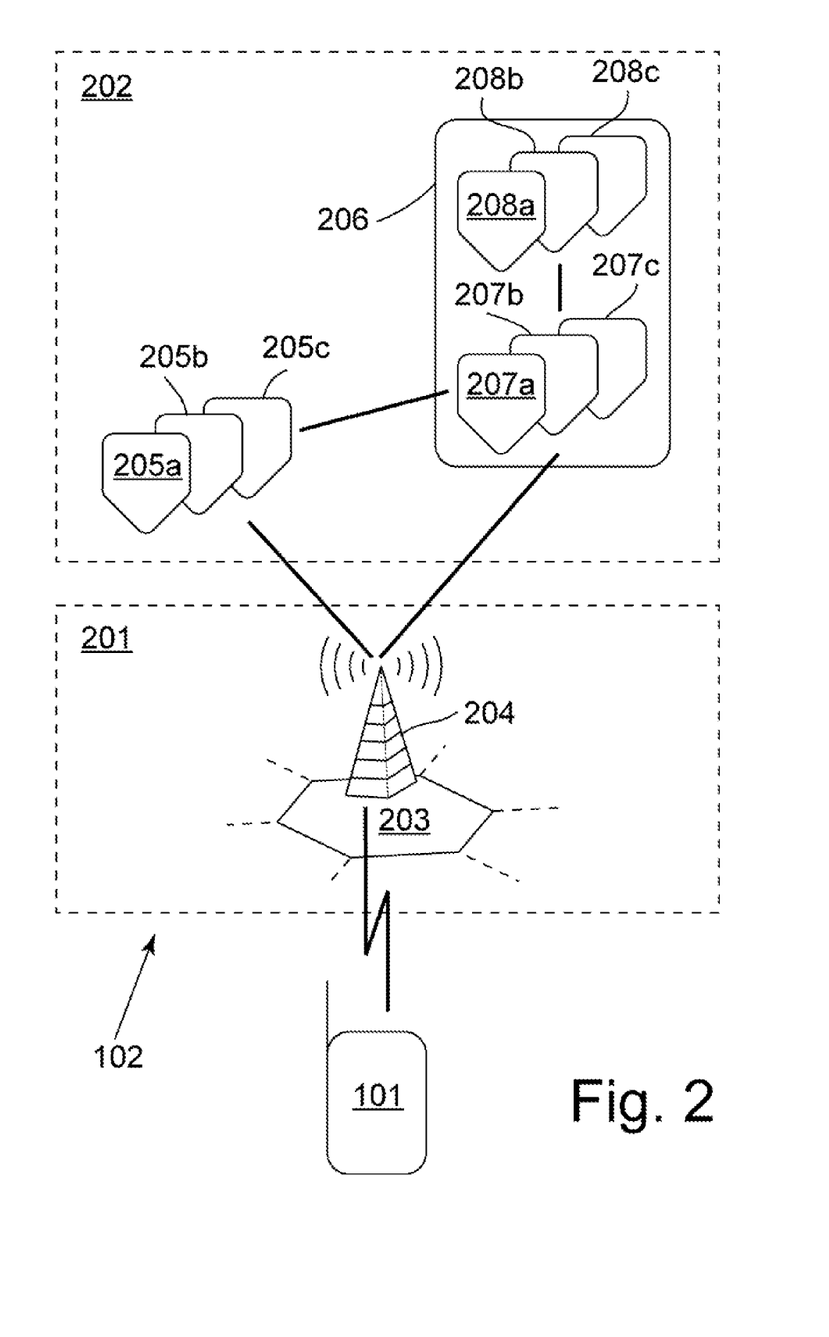
FIG. 2 is a diagram showing the M2M device and components of a mobile communication network.

One embodiment of the mobile communication network is shown in greater detail in FIG. 2. In this embodiment, the mobile communication network 102 can be divided into a radio access network 201 and a core network 202. The radio access network 201 is configured as a cellular network including a plurality of radio cells 203, each being supported by one base station system 204 of the radio access network 201. By way of example, one radio cell 203 and one base station system 204 are depicted in FIG. 2. The base station systems 204 form the access points or access nodes to the mobile communication network 102. A base station system 204 may include the radio devices for connecting to mobile communication devices and one or more unit(s) for controlling radio related functions in the mobile communications network 102.

In specific implementations, the radio access network 201 may comprise an Evolved UTRAN (E-UTRAN) including base station systems 204 configured as eNodeBs. In addition or as an alternative, the radio access network 201 may comprise a UMTS Terrestrial Radio Access Network (UTRAN) or a GSM EDGE Radio Access Network (GERAN). In case the radio access network 201 is a UTRAN, the base station system 204 may comprise a Radio Network Subsystem (RNS) including a Radio Network Controller (RNC) and one or more Node B(s) associated thereto, and in case the radio access network 201 is a GERAN, the base station system 204 may comprise a Base Station Subsystem (BSS) including a Base Station Controller (BSC) and one or more Base Transceiver Stations(s) (BTS(s)) associated thereto. In further embodiments, the radio access network 201 may include base station systems 204 configured in another way, such as, for example, base station systems 204 of a Wireless Local Area Network (WLAN) or a further mobile communication system.

In embodiments of the radio access network 201, there may be base station systems 204 of different configurations, which may be connected to the same core network 202. These base station systems 204 may provide service in different or in overlapping geographic regions. In the latter case, a mobile communication device at certain location may select, which base station system 204 (i.e. which radio technology) it utilizes for accessing the mobile communication network 102 according to its capabilities or other criteria.

The core network 202 particularly provides functions for managing connections between mobile communication devices and the mobile communication network 102 and for controlling and/or switching data connections between a mobile communication device and a communication partner, such as, for example a further mobile communication device or the remote location to which the M2M device 101 can be connected. In particular, the core network 202 may by connected to a system which provides communication services, such as call and messaging service, if such services are not provided by the core network 202 itself, and which may connect the mobile communication network 102 to further communication networks, such as, for example, further mobile communication networks, fixed-line telephone networks and data networks, particularly the Internet.

The core network 202 may comprise at least first network nodes 205*a, b, c* of one type, which are referred to as controlling nodes hereinafter, and a gateway system 206, which may comprise one or more network node(s) 207*a, b, c* and 208*a, b, c* of one or more further type(s), which are referred to as gateway nodes hereinafter. By way of example, three network nodes 205*a, b, c*, 207*a, b, c*, 208*a, b, c* of each type are depicted in FIG. 1, although the actual number of such nodes in the core network 202 of a mobile communication network 102 may be different. Furthermore, the aforementioned configuration of the core network 202 is to be understood only as exemplary; likewise the core network 202 may be configured in another way, e.g. with a other types of network nodes.

In the exemplary core network 202 shown in FIG. 2, the gateway system 206 is primarily responsible for managing data connections of the mobile communication devices connected to the gateway system 206. The gateway system 206 includes gateway nodes 207*a, b, c* which are connected to at least one controlling node 205*a, b, c* and which are referred to as first gateway nodes hereinafter. In addition to the first gateway nodes 207*a, b, c*, the gateway system 206 may include a further level with one or more gateway node(s) 208*a, b, c*. By way of example, FIG. 2 shows an embodiment additionally including second gateway nodes 208*a, b, c* of one type, which are each connected to at least one first gateway node 207*a, b, c*. However, in further embodiments, the gateway system 206 may include no or more further levels of gateway nodes in addition to the first gateway nodes 207*a, b, c*.

In a specific implementation, the core network 202 may be configured as an Evolved Packet Core (EPC) and the gateway system 206 may include Serving Gateways (S-GWs) as first network nodes 207*a, b, c* and Packet Data Network Gateways (P-GWs) as second network nodes 208*a, b, c*. An exemplary embodiment of the subject innovation may also be implemented using a UMTS core network in which only first gateway nodes 207*a, b, c* are present that are configured as Gateway GPRS Support Nodes (GGSNs).

The controlling nodes 205*a, b, c* of the core network 202 are particularly responsible for the mobility management of the connected mobile communication devices. Mobility management may comprise functionality for attaching and detaching mobile communication devices to and from the mobile communication network 102 as well as functionality for determining or tracking the location of the mobile communication devices connected to the mobile communication network 102.

In the embodiment, which is depicted in FIG. 2 by way of example, the controlling nodes 205*a, b, c* exchange signaling data with other entities, but they are not in the path of user data, i.e. user data is forwarded directly from the radio access network 201 to the gateway system 206 and vice versa. However, in further embodiments, the controlling and routing functionalities may be split less strictly and the controlling nodes 205*a, b, c* may also forward user data. In this case, the controlling nodes 205*a, b, c* may be connected between the base station systems 204 and the gateway system 206 in the user data path, for example.

In specific implementations, the controlling nodes 205a, b, c may be configured as MMES or SGSNs. SGSNs are already present in the 2G and 3G core networks. MMES have been introduced as the controlling node 205a, b in an EPC and are connected to base stations systems 204 that are configured as eNodeBs. However, it is to be noted that an EPC may also include SGSNs which are connected to the Node Bs and/or BSSs of the radio access network 201 on one side and to the gateway system 206 on the other side.

Further core network architectures in which an exemplary embodiment of the subject innovation may be executed particularly may differ from the architectures described before in that the controlling nodes 205a, b, c also include functions of the gateway system 206 so that no further nodes are required for managing connections and controlling or switching data connections. An example of such architecture is a circuit switched core network 202 comprising network nodes which are configured as Mobile Switching Centers (MSCs).

As described before, one base station system 204 of the mobile communication network 102 is connected to several controlling nodes 205a, b, c of the core network 202. To a specific connection between a mobile communication device and the mobile communication network 102 one specific controlling node 205i (i=a, b or c) may be assigned at each time. Of course, the controlling node 205i responsible for the connection may change during the course of a connection. However, for changing the controlling node 205i a predetermined procedure may have to be performed, such as, for example, a so-called handover procedure. Unless such procedure is executed, a mobile communication device and a base station system 204 exchange signaling data with the same controlling node 205i for one connection.

The first assignment of a controlling node 205i to a mobile communication device may be made, when the mobile communication device logs on to the mobile communication network 102 in order to set up a connection. For this purpose, the mobile communication device particularly may transmit a request for setting up a connection to the mobile communication network 102, and the request may be received in the base station system 204 to which the mobile communication device is connected. The base station system 204 routes the request to one controlling node 205i and this controlling node 205i controls the setting up and the maintaining of the connection unless a procedure for changing the controlling node 205i executed. In particular, this means that signaling data occurring for the connection is exchanged between this controlling node 205i and the mobile communication device or the base station system 204 and possibly the gateway node(s) 207k, 208j (k, j=a, b or c) responsible for the connection.

Likewise, one first gateway node 207k may be allocated to a specific connection between the mobile communication network 102 and a mobile communication device and route the user data of this connection. Also, the allocated first gateway node 207k may not be changed unless a predetermined procedure is executed.

From the plurality of controlling nodes 205a, b, c, at least one controlling node 205a is responsible for connections between M2M devices 101 and the mobile communication network 102, while further controlling nodes 205b, c are responsible for connections of further mobile communication devices, particularly of mobile communication devices of human users. Herein, it is assumed that only one controlling node 205a is assigned to M2M devices 101. However, it is likewise possible that more than one controlling node 205a is responsible for connections to M2M devices 101.

In one embodiment, it may be provided that the controlling node 205a is utilized only or essentially only for handling connections of M2M devices 101. The latter means that connections of other mobile communication devices are handled by the controlling node 205a only as an exception, e.g. if further controlling nodes 205b, c are overloaded and the controlling node 205a has enough free capacity.

By default, a base station system 204 may route requests for connection setups of M2M devices 101 to the controlling node 205a, which is allocated to M2M devices 101. From this default assignment, the base station system 204 may (only) deviate, when special conditions occur, such as, for example, when a capacity overload of the controlling node 205a occurs, while other controlling nodes a, c, d have enough unused capacity. Thus, connections to M2M devices 101 may only or essentially only be handled by the controlling node 205a. In a further embodiment, the base station system 204 may allocate an M2M device to the controlling node based on a type of the M2M device 101 as will be described below.

By providing such a separate controlling unit 205a for M2M devices 101, the signaling traffic occurring for connections involving M2M devices 101 between the radio access network 201 and the core network 202 and within the core network 202 can be separated from the signaling traffic occurring for connections involving other mobile communication devices, particularly mobile communication devices of human users.

One advantage of such a separation is that a high traffic, which might occur for the M2M devices 101 at certain points in time, does not affect the connections of other mobile communication devices. For instance, such high traffic may be due to a possible programming of a multitude of M2M devices to connect to remote locations at certain point in time, such as, for example, a certain clock hour. Would high traffic caused by M2M devices 101 be handled by controlling nodes 205a, b, c, which (also) handle connections involving further mobile communication devices, the controlling nodes 205a, b, c could become overloaded and the other mobile communication devices or their users could suffer from a reduced connection quality or they could even not connect to the mobile communication network 102.

Moreover, special routines for controlling the setting up and/or the maintaining of connections of M2M devices 101 may be implemented exclusively in the controlling node 205a allocated to M2M devices 101. Hereby, connections of M2M devices 101 can be controlled in a special way differently than the connections of other mobile communication devices without having to implement such routines in each controlling node 205a, b, c of the mobile communication network 102. Examples of such special routines for M2M devices 101 are given below.

The allocation of the controlling node 205a to M2M devices 101 may be stored in a file and/or database of the base station systems 204. This may be done essentially manually by the operator of the mobile communication network 102. In a further embodiment, this may be done automatically within a "self-configuration" process. This process may be executed, when the connection between a base station system 204 and the core network 202 is established and/or when the configuration of the connections of the base station system 204 are changed.

The self-configuration process may include the following steps, which are schematically in FIG. 2 for a base station 204 and two controlling nodes 205i, j. The process may be initiated by an operation and maintenance (O&M) system 301 of the mobile communication network 102. In step 302, the O&M system may pass to the relevant base station system 204 information about the controlling nodes 205i, j to which the base station system 204 shall connect. The information may include details as to how to establish a data exchange with the controlling nodes 205*i, j*. If the Internet Protocol (IP) is used for the data exchange, the details may particularly include the IP addresses of the controlling nodes 205*i, j*.

Figure 3:
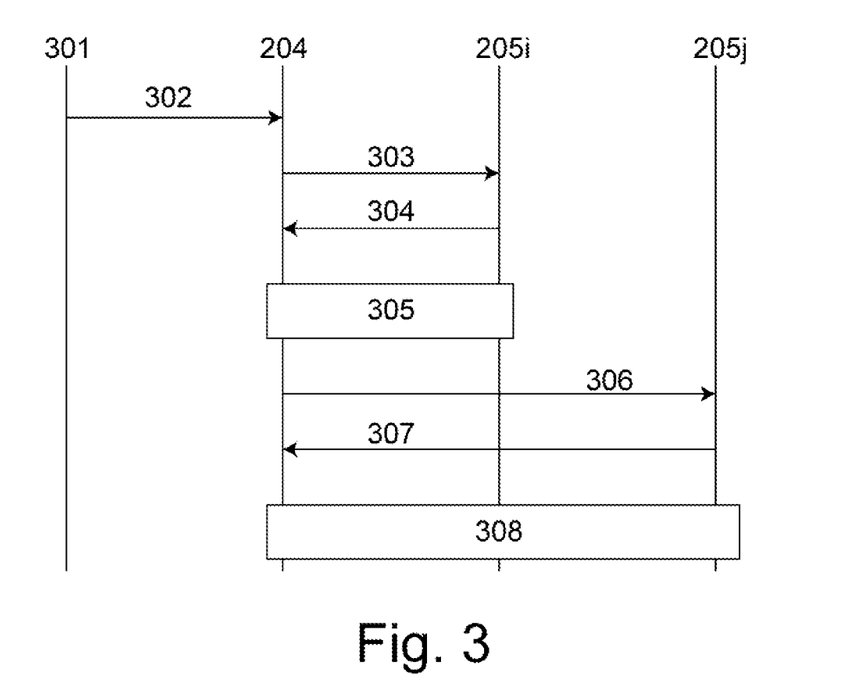
FIG. 3 is a diagram showing steps for establishing a connection between network nodes of a mobile communication network.

When the base station system 204 has received the information from the O&M system 301, it may send a setup request message to the controlling node 205*i* in step 303. The controlling node 205*i* answers the setup request message by sending a setup response message to the base station system in step 304.

In particular, the setup response message may include an identification code for uniquely identifying the controlling node 205*i* in the mobile communication network 102. If the controlling node 205*i* is an MME, the identification code may be configured as a Globally Unique MME Identifier (GUMMED, for example.

If the controlling node 205*i* is allocated to M2M devices 101, the setup response message comprises corresponding information. And if such information is present in the setup response message, the base station system 204 may store in the file or database that the controlling node 205*i* is responsible for the connections of M2M devices 101.

In addition, the setup response message may include further information which may be used for establishing and/or utilizing the connection between the base station system 204 and the controlling node 205*i*.

Using the information exchanged before in the setup request and response messages, the connection between the base station system 204 and the controlling node 205*i* is then being established in step 305.

In the same way as described before for the base station system 204 and the controlling node 205*i*, the connection between the base station system 204 and the further controlling node 205*j* is established. Here, the steps 306-308 shown in FIG. 3 correspond to the steps 303-305 described before.

Among first gateway nodes 207*a, b, c*, there may also be at least one first gateway node 202 which is allocated to M2M devices 101. As with the corresponding controlling node 205*a*, it may be provided that this first gateway node is only or essentially only used for routing connections of M2M devices 101. Likewise, it may be provided that all or essentially all connections of M2M devices 101 are handled by the first gateway node 207*a*. When a special gateway node 107*a* is allocated to M2M device, the controlling node 205*a* may establish the (user) data connection through the first gateway node 202, when a data connection of an M2M device 101 is being established. The utilization of a separate first gateway node 207*a* for the handling of connections of M2M devices 101 essentially has the same advantageous as the utilization of a separate controlling node for such devices.

When an M2M device 101 logs on to the mobile communication network 102, it activates a connection to the base station system 205, which supports the geographical region in which the M2M device 101 is located and the radio technology utilized by the M2M device 101.

In the log on procedure, the M2M device 101 sends to the base station system 205 an indication that it is an M2M device 101.

Figure 4:
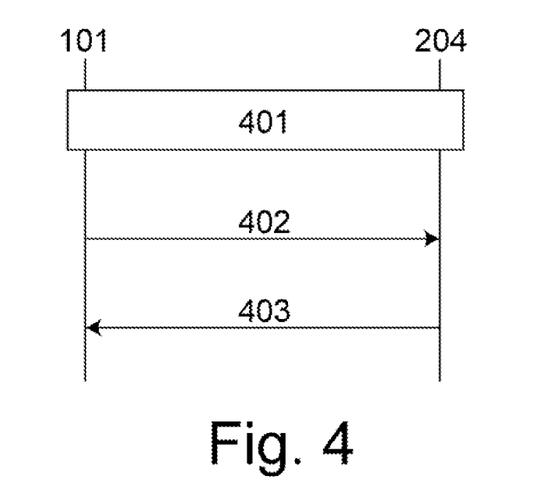
FIG. 4 is a diagram showing steps for providing to a mobile communication network an indication that a device is an M2M device.

In one embodiment, which is schematically depicted in FIG. 4, the M2M may provide this indication upon a request of the base station system 204. After having activated a connection to the base station in step 401, the base station system 204 may transmit to the M2M device 101*a* capabilities request message in step 402. The capabilities request message may be answered by the M2M device with a capabilities response message in step 403. The capabilities response message may include the indication that the device 101 is an M2M device. In addition, the capabilities response message may include further information about capabilities of the M2M device 101, such as, for example, about data transmission modes provided in the mobile communication network 102 that the M2M device 101 supports.

In one embodiment, the indication may only specify that the device 101 is an M2M device. In further embodiment, there may be several predetermined types of M2M devices 101. Particularly, M2M devices 101 may be categorized according to their mobility so that the mobility management in the mobile communication network 102 can be adapted to the type of the M2M device 101. In addition or as an alternative, M2M devices 101 may be categorized according to the amount of user data they usually sent and/or receive so that data routing resources in the mobile communication network 102 can be allocated to and/or reserved for an M2M device 101 accordingly. In one embodiment, there may be the four types including stationary, fast moving, low data volume and high data volume M2M devices 101.

When several types are provided, the indication sent from the M2M device 101 to the base station system 204 may specify the type of the specific M2M device 101 (thereby also indicating that is an M2M device 101).

If device types are provided, the indication may be an identifier which is present in the information, particularly in the capabilities response message, sent from a mobile communication device to a base station system 204 during log on, (only) in case the mobile communication device is an M2M device 101. If the M2M devices 101 are categorized and their type is specified in the indication, the indication may be a bitmap having a number of bits that corresponds to the number of types. Each bit may be assigned to one type and if the specific M2M device 101 falls into a type, the corresponding bit is set (i.e. has a value of one). Otherwise the bit is not set (i.e. has a value of zero). Mobile communication devices which are not configured as M2M devices may not sent the bitmap or they may sent a bitmap in which no bit is set.

The information used for sending or generating the indication, i.e. the information that a device 101 is an M2M device and possibly the type of the M2M device 101, may be stored in the SIM 105 or another data storage of the M2M device 101. It may be read upon receiving the request by the base station system 204 for transmitting the indication.

Figure 5:
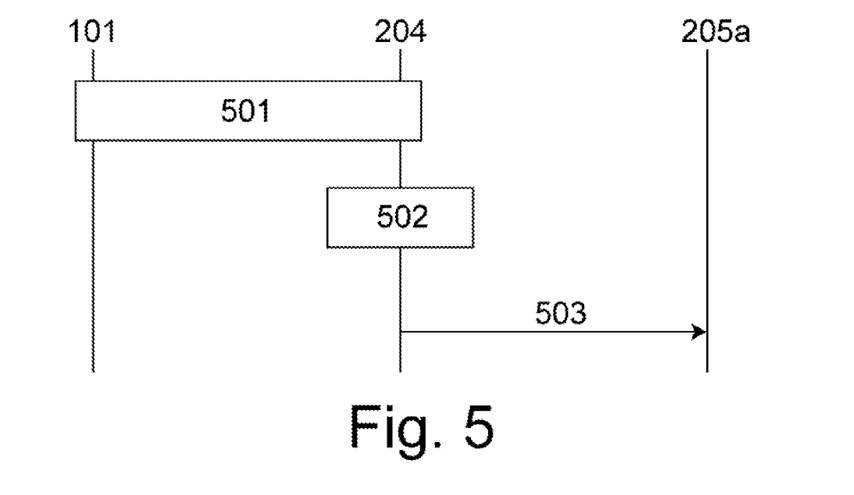
FIG. 5 is a diagram showing steps for setting up a connection between an M2M device and a mobile communication network.

A part of the process of setting up a connection between the M2M device 101 and the mobile communication network 102 is schematically depicted in FIG. 5. After having received from the M2M device 101 the indication identifying the device 101 as an M2M device in step 501, the base station system 204 recognizes and evaluates the indication in step 502. Due to the indication, the base station system 204 allocates to the connection to the M2M device 101 the controlling node 205*a* which is responsible for the connections of M2M devices 101, if no special circumstances are present (see above). For this purpose, the base station system 204 may use the information stored therein stored therein in the self-configuration process described before. Then, the base station system 204 then sends a request for setting up a data connection to the selected controlling unit 205*a* in step 503.

Upon receiving the request, the controlling node 205*a* may control the setting up of the connection in a way which is, as such, known to a person skilled in the art.

In a modification of the process described before, the controlling node 205*a* may not be allocated to the connection of an M2M device 101 in any case. In particular, it may be provided that the allocation is made based on the type of the M2M device, if the type is specified in the indication. Here, it may be provided that only for predetermined types of M2M device 101 the connection is allocated to and handled by the controlling node 205*a*, while the connections to M2M devices 101 of other types are handled by one or more further controlling node(s) 205*b, c*. For instance, the controlling node 205*a* may only handle connections to essentially stationary M2M devices 101, while the connections to (fast) moving M2M devices may be handled by one or more further controlling node(s) 205*b, c*.

In connection with the request for setting up the connection, the base station system 204 may also forward the indication identifying the device 101 as an M2M device to the controlling node 205*a* in the same format as it has been received in the base station system 204 or in another format. This may particularly be done, when the indication specifies one or more types to which the M2M device 101 belongs and/or when also requests for setting up connections of other mobile communication devices 101 are routed to the controlling node 205*a*.

When the connection between the M2M device 101 and the mobile communication network 102 is established, the controlling node 205*a* may control the maintaining of the connection according to special routines, which are not executed for mobile communication devices that are not M2M devices 101.

As one example, if a data connection is to be established and an allocation of a first gateway node 207*a* to M2M devices 101 is provided, the controlling node 205*a* may particularly select the first gateway node 207*a*, which is allocated to the M2M devices 101, from the first gateway nodes 207*a, b, c* of the core network 202 and instructs this first gateway node 207*a* to establish the data connection with the M2M device 101.

In one embodiment, it may also be provided that the first gateway node 207*a* is (only) allocated to predetermined types of M2M devices 101. Here, the controlling node 205*a* may select the first gateway node 207*a* based on the type of the M2M device 101, if the type has been specified in the indication sent by the M2M device. If the indication specifies a type to which the first gateway node 207*a* is allocated, the controlling node may instruct the first gateway node 207*a* to establish the data connection to the M2M device 101. Otherwise, it may instruct another first gateway node 207.

Furthermore, mobile communication devices are usually obliged to inform the mobile communication network 102 about their current position periodically or when they leave an area of the cellular radio access network 201 and enter a new area. This process is referred to as location area update, routing area update or tracking area update in different radio access networks 101 and supports the mobile communication network 102, when a data connection is to be established to a mobile communication device in case a call and/or data is present (so called "paging").

The location update process is particularly executed, when there is no active data connection to a mobile communication device and as long as the mobile communication device informs the mobile communication network 102 about its position within regular intervals, the connection to the mobile communication device is uphold. When a time interval ends without receiving such information from the mobile communication device, it may be detached from the mobile communication network 102.

With regards to an M2M device 101, the controlling unit 101 may instruct an M2M device 101 which is attached to the mobile communication network 102 to inform the network about its location in predetermined regular time intervals, which may be greater than the time intervals in which other mobile communication devices, which are no M2M devices 101, inform the mobile communication network 102 about their position. By increasing the length of the time intervals unnecessary signaling traffic between the M2M device and the mobile communication network 102 can be dispensed with.

The aforementioned instruction may particularly be sent to M2M devices 101 which are (essentially) stationary. Such M2M devices 101 may be identified using the type information given in the indication sent by those M2M devices 101. If it is not provided that the indication specifies the type of the M2M device 101, the instruction may be send to essentially all M2M devices 101.

Further routines which may be executed especially for M2M devices 101 by the controlling node 205*a*, may affect other procedures of the Non-Access Stratum (NAS) involving the core network 202 and an M2M device. Also, security relevant procedures in the mobile communication network 102, such as, for example, the change of security keys, may be carried out in special way for M2M devices.

When the M2M device 101 is being attached to the mobile communication network 101, an information may be sent to the M2M device 101 which identifies the controller node 205*a* that was selected for handling the connection to the M2M device 101. This information may be stored in the M2M device 101, particularly in the SIM 105 of the M2M device. When the M2M device 101 logs on to the mobile communication network 102 again, it may sent this information to the relevant base station system 205 and the base station system 205 may allocate to the M2M device the controller node 205*a*, which is specified in the information. Thus, in this case, the base station system 205 does not have to evaluate the indication that the device 101 is an M2M device in order to select a controller node 205*a*, when the M2M device 101 logs on to the mobile communication network 101 again (and the information is still stored in the M2M device 101, what may not be the case, if the M2M device 101 intermittently has been connected to another mobile communication network which as overwritten the information).

In one embodiment, the controlling unit 205*a* may allocate a temporary identification code to the M2M device 101, which may be configured as Globally Unique Temporary User Equipment Identity (GUTI). The temporary identification may include as one part the identification code of the controlling node 205*a* that handles the connection between the M2M device and the mobile communication network 102, particularly the GUMMEI of the controlling node 205*a*. The temporary identification code may be the aforementioned information which is sent to the M2M device 101. When the M2M device logs on to the mobile communication network 102 again, it may sent the temporary identification code to the relevant base station system 205 and the base station system may transmit a request for setting up a connection to the controller node 205*a* whose identification code is included in the temporary identification code of the M2M device 101.

While the invention has been illustrated and described in detail in the drawings and foregoing description, such illustration and description are to be considered illustrative or exemplary and not restrictive; the invention is not limited to the disclosed embodiments. In particular, the invention may also be practiced in communication networks of other types than those mentioned herein. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an"

does not exclude a plurality. A single processor or other unit may fulfill the functions of several items recited in the claims.

What is claimed is:

1. A method for setting up and/or maintaining a connection between a machine-to-machine (M2M) device and a mobile communication network, wherein setting up means establishing the connection between the M2M device and the mobile communication network, the method comprising:

receiving by a network node of the mobile communication network an indication specifying that the device is an M2M device and being sent by the M2M device; and controlling via the network node a setting up and a maintaining of the connection based on the indication routing, via the network node, a request for setting up the connection to a second network node of the mobile communication network based on the indication, wherein the second network node transmits to the network node information that the second network node is responsible for connections between M2M devices and the mobile communication network, when connecting the first and the second network node, and the network node routing the request for setting up the connection to the second network node based on the information received from the second network node such that the connections between the M2M device and the mobile communication network are handled by the second network node.

2. The method recited in claim 1, wherein the first network node of the mobile communication device is connected to a plurality of network nodes of one type, the first network node selecting the second network node to which the request is routed from the plurality of network nodes based on the indication.

3. The method recited in claim 1, wherein the first network node comprises a network node of a radio access network of the mobile communication network.

4. The method recited in claim 3, wherein the first network node comprises a base station system of the mobile communication network.

5. The method recited in claim 1, wherein the second network node is network node of a core network of the mobile communication network.

6. The method recited in claim 5, wherein the second network node comprises a Mobility Management Entity or a Serving GPRS Support Node.

7. The method recited in claim 1, wherein the indication includes a specification of a type of the M2M device.

8. The method recited in claim 7, wherein the type of the M2M device is selected from a set of predetermined types.

9. A network node of a mobile communication network for controlling a setting up and a maintaining of a connection between the mobile communication network and a machine-to-machine (M2M) device, wherein setting up means establishing the connection between the M2M device and the mobile communication network, the network node being adapted to receive an indication specifying that the device is an M2M device and being sent by the M2M device, the network node being adapted to route a request for setting up the connection to a second network node of the mobile communication network based on the indication, the network node being adapted to receive from the second network node information that the second network node is responsible for connections between M2M devices and the mobile communication network, and the network node being further adapted to route the request for setting up the connection to the second network node based on the information received from the second network node such that the network node being adapted to control the setting up and/or the maintaining of the connection based on the indication such that the connections between the M2M device and the mobile communication network are handled by the second network node.

10. The network node recited in claim 9, the network node being adapted to connect to a plurality of other networks nodes of one type and being adapted to select the second network node to which the request is routed from the plurality of other network nodes based on the indication.

11. The method recited in claim 7, wherein the information transmitted by the second network node to the network node specifies the type of the M2M device the second network node is responsible for, the method comprises the further step of selecting the second network node based on the specification of the type of the M2M device.

12. The network node recited in claim 9, the network node being adapted to identify the type of the M2M device the second network node is responsible for, and the network node being adapted to select the second network node based on the specification of the type of the M2M device.

* * * * *